Figure 1:
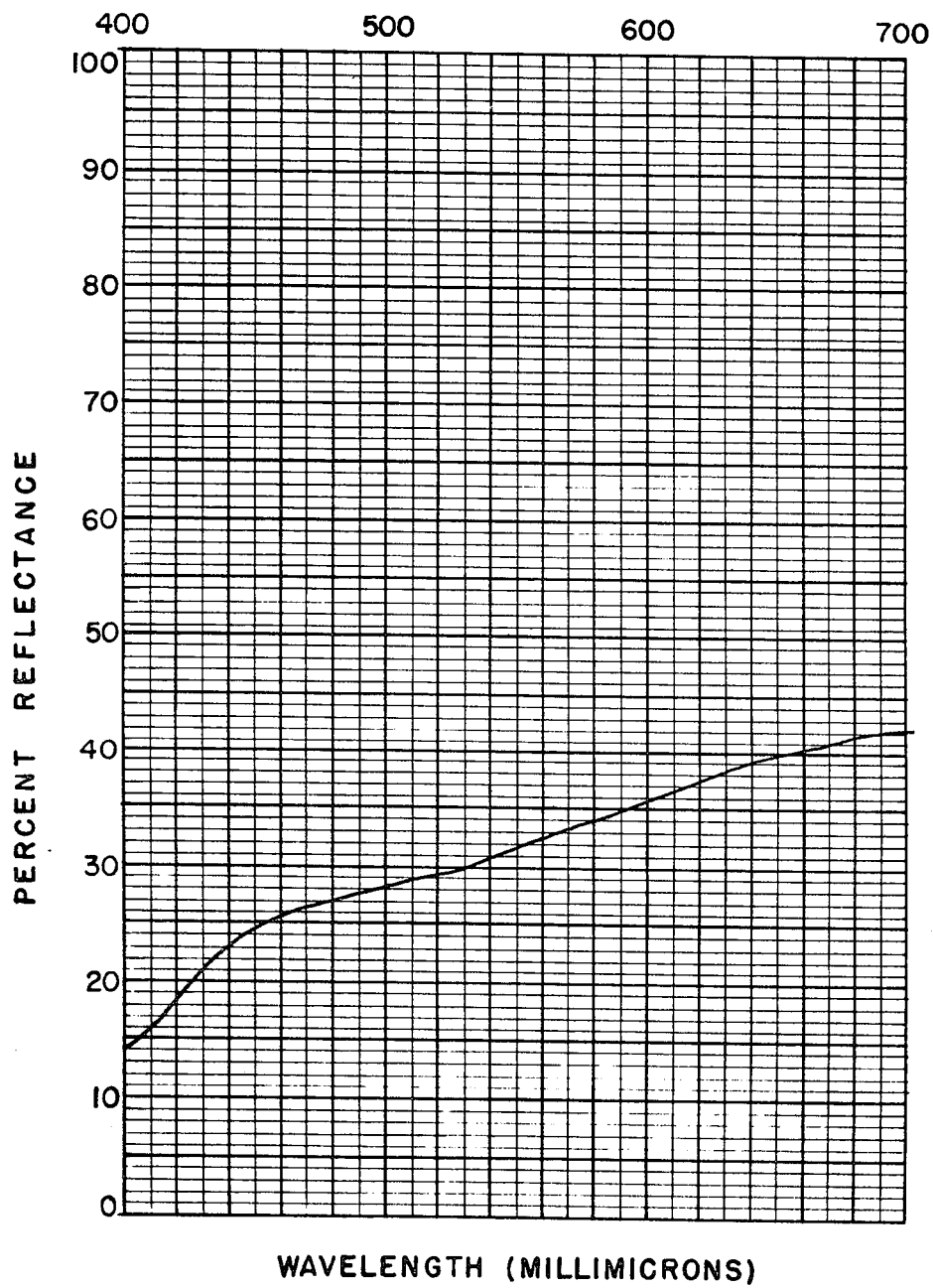

United States Patent

[11] 3,616,240

[72] Inventor John Andrew Growich, Jr.
   New City, N.Y.
[21] Appl. No. 601,250
[22] Filed Oct. 12, 1966
[45] Patented Oct. 26, 1971
[73] Assignee American Cyanamid Company
   Stamford, Conn.
   Continuation-in-part of application Ser. No.
   508,356, Nov. 17, 1965, now abandoned.

[54] 7-CHLORO-6-DEMETHYL-TETRACYCLINE FERMENTATION
   2 Claims, 12 Drawing Figs.

[52] U.S. Cl. ........................................... 195/80
[51] Int. Cl. ........................................... C12d 9/00
[50] Field of Search ................................ 195/80

[56] References Cited
   UNITED STATES PATENTS
   2,878,289   3/1959   McCormick et al. ......... 195/80 X
   3,092,556   6/1963   Growich et al. ............... 195/80

OTHER REFERENCES
   Chemical Abstracts, Vol. 62, 1965, pg., 15107d, Copy in Chemical Library

*Primary Examiner*—Joseph M. Golian
*Attorney*—Edward A. Conroy, Jr.

ABSTRACT: This disclosure describes a process for the production of 7-chloro-6-demethyltetracycline to the exclusion of 6-demethyltetracycline by fermentative biosynthesis using strains of *Streptomyces aureofaciens* which are characterized by their ability to impart to a 1:200 aqueous dilution of the whole harvest mash a color characterized by a spectrophotometric reflectance curve such that when the percent reflectance is plotted linearly against the wavelength the resulting curve, between 460 m$\mu$ and 520 m$\mu$, will either exhibit a maximum or have a point of inflection of zero slope.

REFLECTANCE CURVE OF WHOLE HARVEST MASH OBTAINED WITH S. AUREOFACIENS STRAIN S1071

REFLECTANCE CURVE OF WHOLE HARVEST MASH OBTAINED WITH S. AUREOFACIENS STRAIN V62

REFLECTANCE CURVE OF WHOLE HARVEST MASH OBTAINED WITH S. AUREOFACIENS STRAIN B740

REFLECTANCE CURVE OF WHOLE HARVEST MASH OBTAINED WITH S. AUREOFACIENS STRAIN V138

REFLECTANCE CURVE OF WHOLE HARVEST MASH OBTAINED WITH S. AUREOFACIENS STRAIN E 475

REFLECTANCE CURVE OF WHOLE HARVEST MASH OBTAINED WITH S. AUREOFACIENS STRAIN E1311

REFLECTANCE CURVE OF WHOLE HARVEST MASH OBTAINED WITH S. AUREOFACIENS STRAIN ED1723

REFLECTANCE CURVE OF WHOLE HARVEST MASH OBTAINED WITH S. AUREOFACIENS STRAIN ED2047

REFLECTANCE CURVE OF WHOLE HARVEST MASH OBTAINED WITH S. AUREOFACIENS STRAIN ED2314

REFLECTANCE CURVE OF WHOLE HARVEST MASH OBTAINED WITH S. AUREOFACIENS STRAIN IE2322

REFLECTANCE CURVE OF WHOLE HARVEST MASH OBTAINED WITH S. AUREOFACIENS STRAIN IE2750

7-CHLORO-6-DEMETHYL-TETRACYCLINE FERMENTATION

This application is a continuation-in-part of my copending application Ser. No. 508,356, filed Nov. 17, 1965, now abandoned.

This invention relates to an improved process for the production of 7-chloro-6-demethyltetracycline and, more particularly, is concerned with the production of 7-chloro-6-demethyltetracycline to the exclusion of 6-demethyltetracycline by fermentative biosynthesis using strains of *Streptomyces aureofaciens* which are characterized by their ability to impart to a 1:200 aqueous dilution of the whole harvest mash a color characterized by a spectrophotometric reflectance curve such that when the percent reflectance is plotted linearly against the wavelength, the resulting curve, between 460 m$\mu$ and 520 m$\mu$, will either exhibit a maximum or have a point of inflection of zero slope.

The novel mutant strains of the present invention are strains of the species *Streptomyces aureofaciens*. The representative *S. aureofaciens* strains described below are direct descendants of the 7-chlorotetracycline-producing *S. aureofaciens* A–377 soil isolate described in U.S. Pat. No. 2,482,055 to Duggar and deposited at the Northern Regional Research Laboratories, Peoria, Ill. and indexed as NRRL 2209, derived by mutagenic processes known to the art, e.g., ultraviolet irradiation, nicotine, and nitrogen mustard. Typical mutant strains of *S. aureofaciens* which possess the unique properties described herein have been designated by me as 1E–2322 and 1E–2750. Viable representative cultures of the novel mutant strains of the present invention have been deposited at the Northern Regional Research Laboratories, Peoria, Ill. and have been assigned the following accession numbers:

| Strain | NRRL No. |
|--------|----------|
| 1E–2322 | 3204 |
| 1E–2750 | 3234 |

It will be understood, of course, that mutants which possess this unique property of imparting a specific color to their whole harvest mashes may be derived from these strains by conventional procedures. These mutants may vary somewhat in general morphological and physiological characteristics as do the various strains of the *S. aureofaciens* species. It is also to be expected that 7-chloro-6-demethyltetracycline-producing strains of *S. aureofaciens* of the invention, i.e., with a reflectance curve having either a maximum or a point of inflection of zero slope between 460 m$\mu$ and 520 m$\mu$, may be found in nature or derived from presently isolated strains *S. aureofaciens* by mutagenic methods well known to the art. The strains of the present invention display the fundamental characteristics of the species *S. aureofaciens* and may be readily identified as members of this species although differing from previously described strains of *S. aureofaciens*, not only in pigmentation on solid media, but also in the colors of the whole harvest mashes obtained therewith.

The antibiotic 7-chloro-6-demethyltetracycline was first described and claimed, together with methods of its production, in the McCormick et al. U.S. Pat. No. 2,878,289 wherein a 7-chloro-b-demethyltetracycline-producing strain of *S. aureofaciens* was cultivated in a fermentation medium. That patent also discloses that other tetracyclines, such as 6-demethyltetracycline, 7-chlorotetracycline and tetracycline are produced at the same time in a fermentation medium when the fermentation conditions, including the micro-organism therein disclosed, are used. Additionally, that patent discloses that 7-bromo-6-demethyltetracycline is a concomitant product when bromine is a constituent of the fermentation medium. Further evidence of the production of more than one tetracycline in a fermentation medium in which 7-demethylchlortetracycline is produced may be found in the Perlman et al. U.S. Pat. No. 3,028,311 and the Neidleman U.S. Pat. No. 3,061,552 wherein so-called 6-methylation inhibitors are present in a fermentation medium in which a 7-chlortetracycline producing strain of *S. aureofaciens* is used.

Additional disclosures of the production of 7-chloro-6-demethyltetracycline by cultivating 7-chlortetracycline producing strains of *S. aureofaciens* in the presence of 6-methylation inhibitors are shown in the Goodman et al. U.S. Pat. Nos. 3,019,172 and 3,127,328. These processes are also faced with the problem of concomitant formation of other tetracyclines. Thus, in each a mixture of 7-chlortetracycline, tetracycline, 7-chloro-6-demethyltetracycline and 6-demethyltetracycline is produced.

The concomitant production of 6-demethyltetracycline (or other tetracyclines) is objectionable when 7-chloro-6-demethyltetracycline is the principal product being sought. While the specifications of pharmaceutical quality 7-chloro-6-demethyltetracycline permit small quantities of 6-demethyltetracycline to be present, the presence of any sizable quantity of 6-demethyltetracycline is objectionable. The presence of these two antibiotics in the same fermentation mash in any sizable amounts also involves difficult problems of separation in the refining or extraction procedures when 7-chloro-6-demethyltetracycline is the desired product. It is possible, of course, to extract the two antibiotics from the fermentation mash and by selective refining procedures to effect a separation of the antibiotics. However, the refining procedures for effecting separation of the antibiotics are difficult and usually involve some loss in total antibiotic potency. Moreover, in those instances where 7-chloro-6-demethyltetracycline is the principal product of the fermentation, 6-demethyltetracycline is unwanted and is customarily removed and discarded. Hence, any method that results in the production of 7-chloro-6-demethyltetracycline to the exclusion of 6-demethyltetracycline constitutes a marked contribution to the art of antibiotic fermentation.

It is indeed surprising that the novel mutant strains of *Streptomyces aureofaciens* of the present invention will produce, in a conventional fermentation, 7-chloro-6-demethyltetracycline to the exclusion of 6-demethyltetracycline. Furthermore, there is no detectable production of tetracycline or 7-chlorotetracycline. The discovery of these strains obviates the need for costly and difficult extraction and purification procedures, since the crystals of 7-chloro-6-demethyltetracycline obtained are of pharmaceutical quality. Obviously the discovery of these strains denotes a marked contribution to the art of producing the highly effective antibiotic 7-chloro-6—-demethyltetracycline.

In general, these new strains and the strains which are presently known in the art which produce 7-chloro-6-demethyltetracycline in conventional media may be divided in three categories: (1) *S. aureofaciens* strains ATCC 12551, 12552, 12553 and 12554 which are described in U.S. Pat. No. 2,878,289 McCormick et al.) and which produce varying amounts of 7-chloro-6-demethyltetracycline, 6-demethyltetracycline, tetracycline and 7chlorotetracycline; (2) *S. aureofaciens* strains V–138, E–475, E–1311, ED–1723, ED–2047 and ED–2314 which are disclosed in the following patents: V–138 in U.S. Pat. No. 3,037,916 (Goodman), E–475, E–1311, ED–1723 and ED–2047 in U.S. Pat. No. 3,050,446 (Goodman), ED–2314 in U.S. Pat. No. 3,145,154 (Goodman); which produce varying amounts of 7-chloro-6-demethyltetracycline and 6-demethyltetracycline to the virtual exclusion of methylated tetracyclines; and (3) the new strains of the present invention, e.g., 1E–2322 and 1E–2750, which produce 7-chloro-6-demethyltetracycline to the exclusion of all other tetracyclines.

The novel mutant strains of the present invention may be distinguished from the two groups of prior art strains by a mathematical interpretation of the spectrophotometric reflectance curves of their respective whole harvest mashes. More precisely, when the percent reflectance of diluted samples (1:200 aqueous) of the whole harvest mashes of good yield (such as the examples set forth hereinafter) of the novel strains of the present invention is plotted linearly against the wavelength, the resulting curve, between 460 m$\mu$ and 520 m$\mu$, will either exhibit a maximum or have a point of inflection of zero slope.

Figure 2:
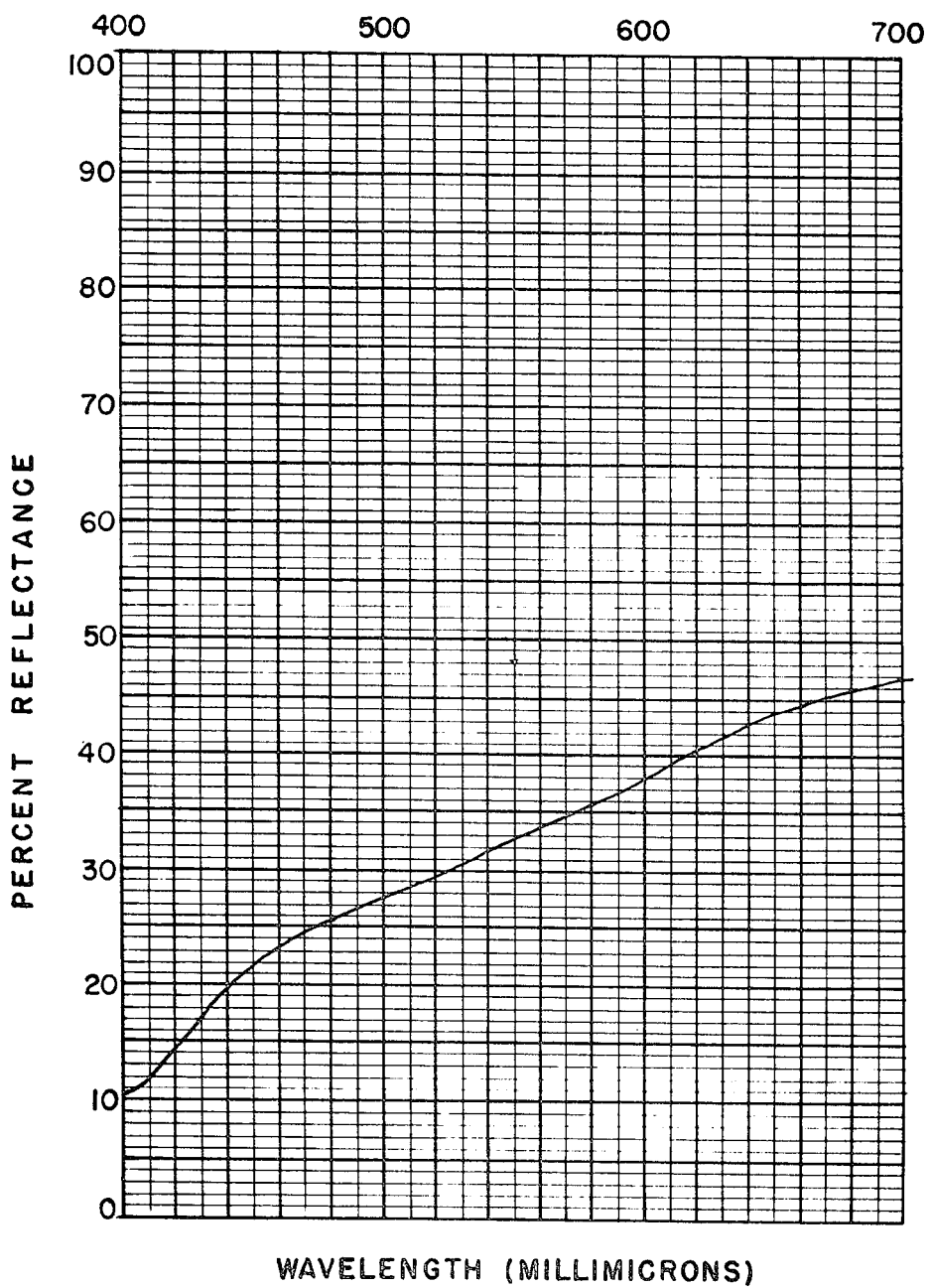
Figure 3:
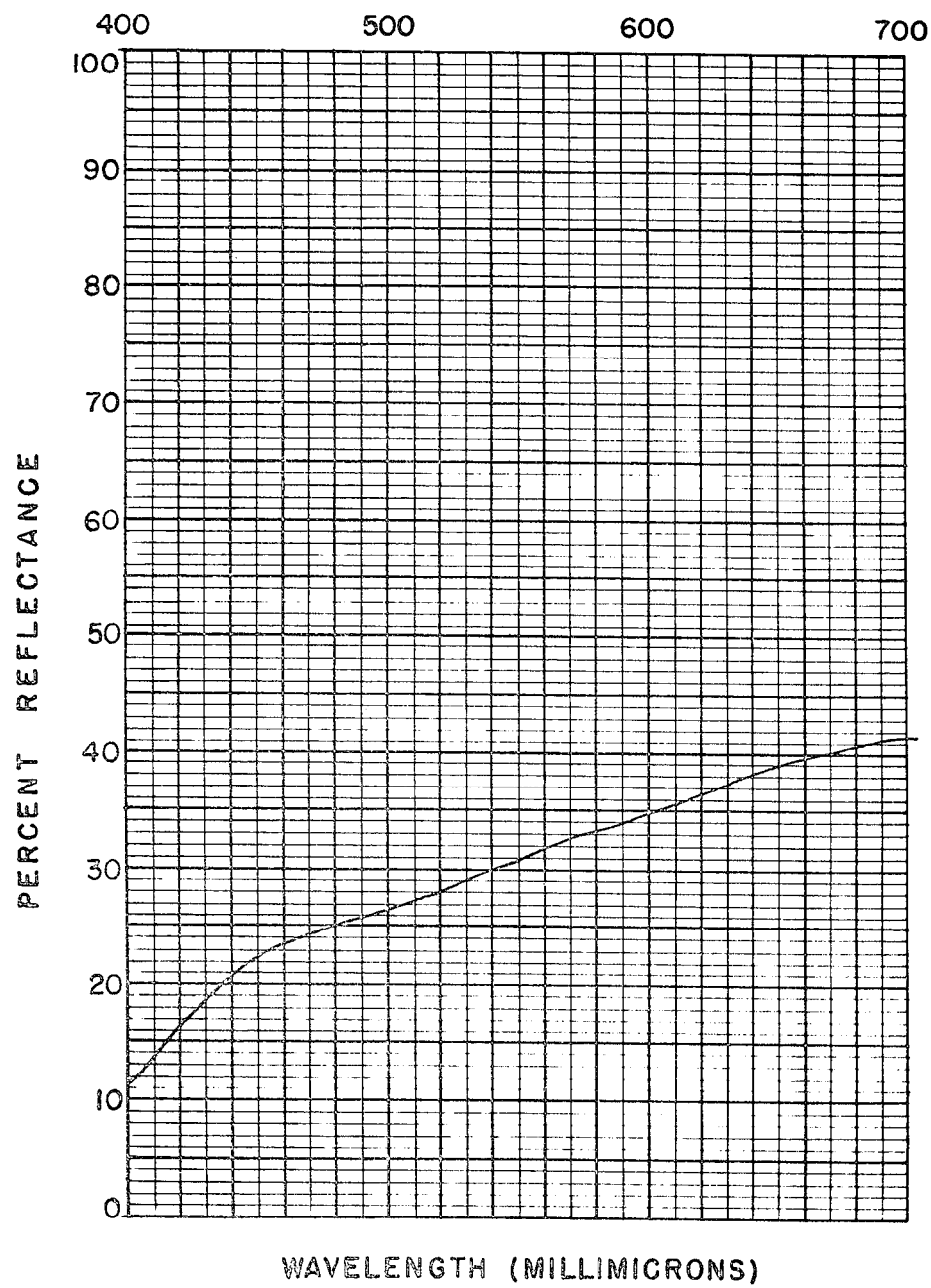
Figure 4:
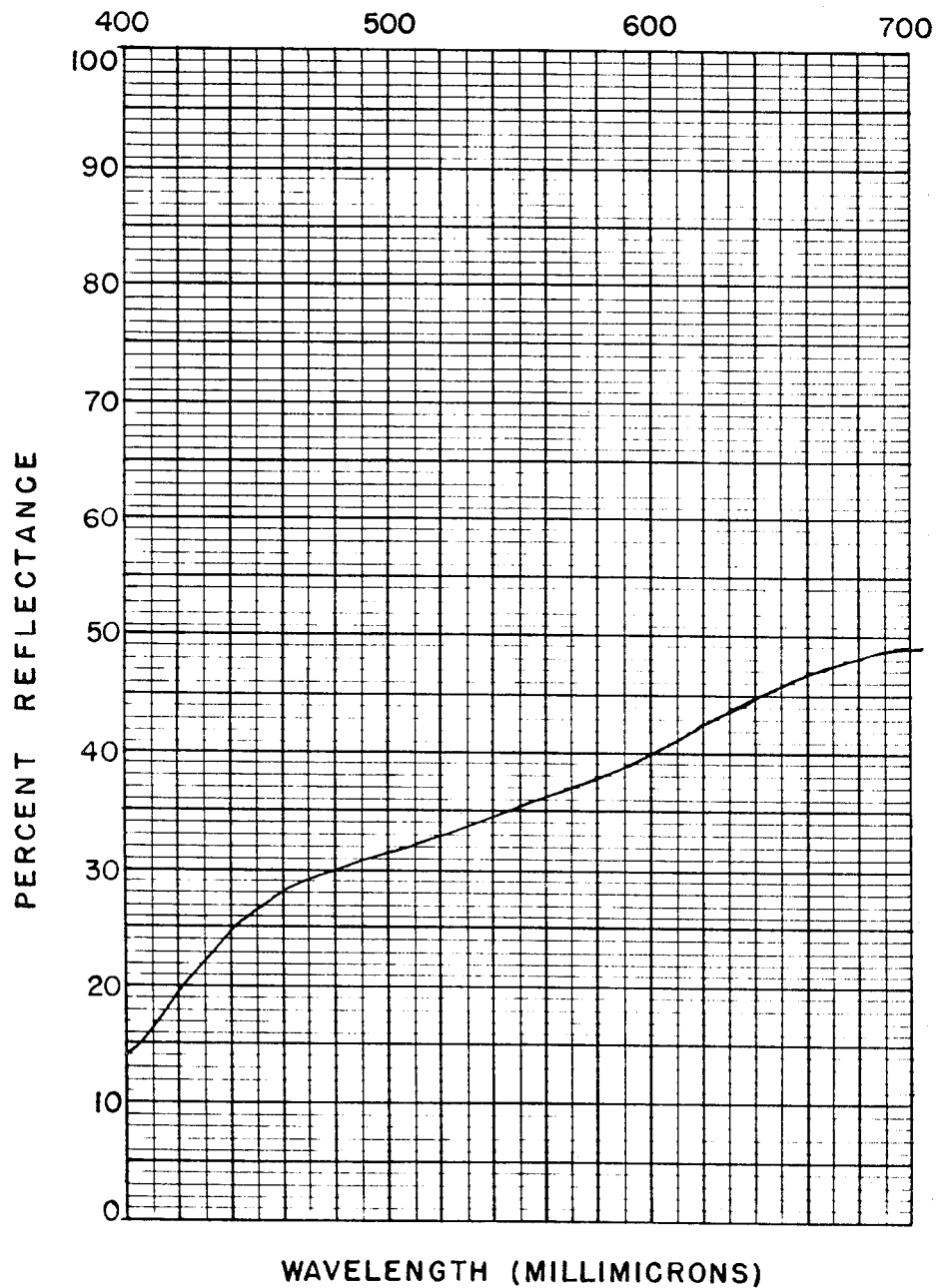
Figure 5:
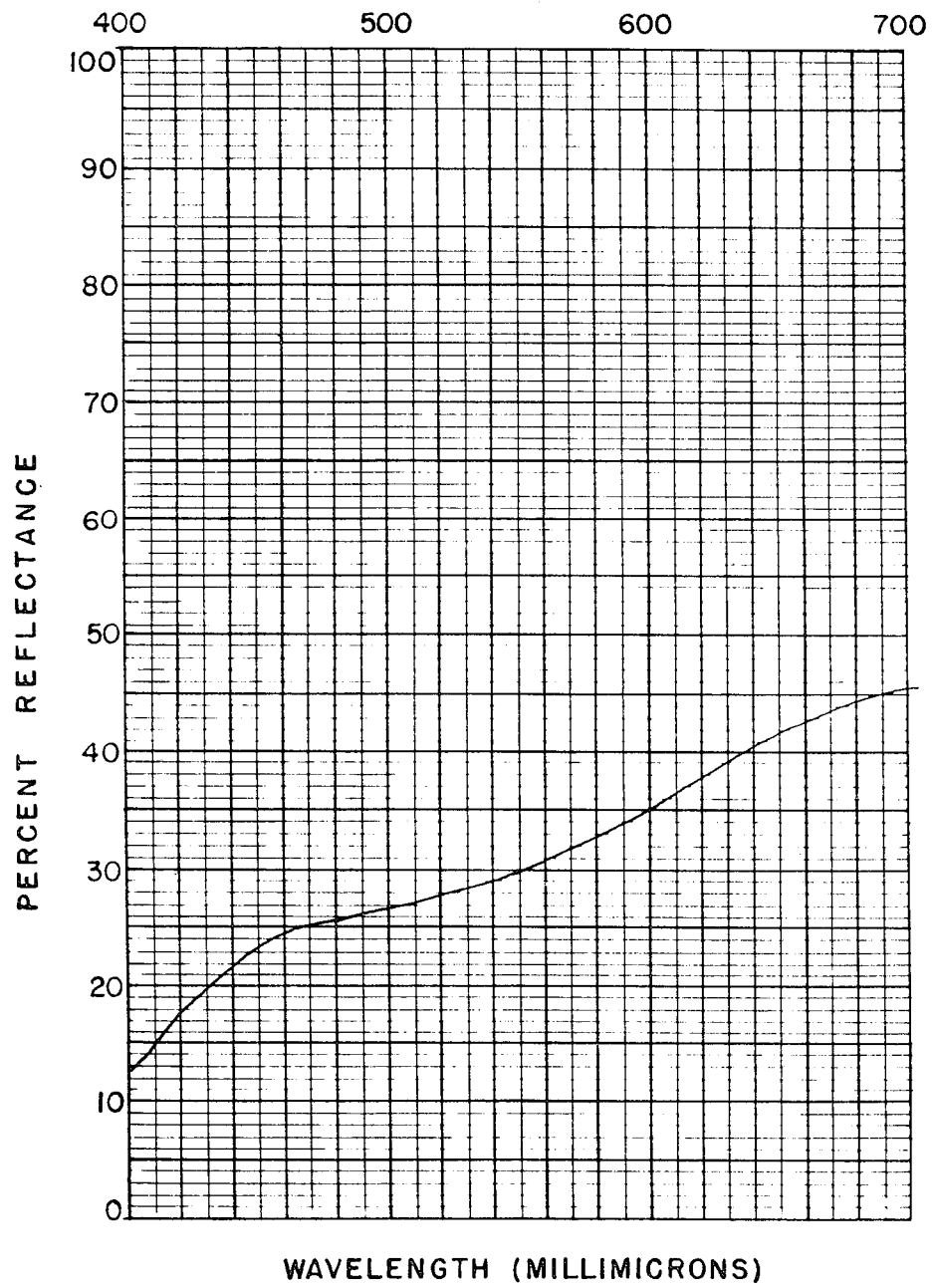
Figure 6:
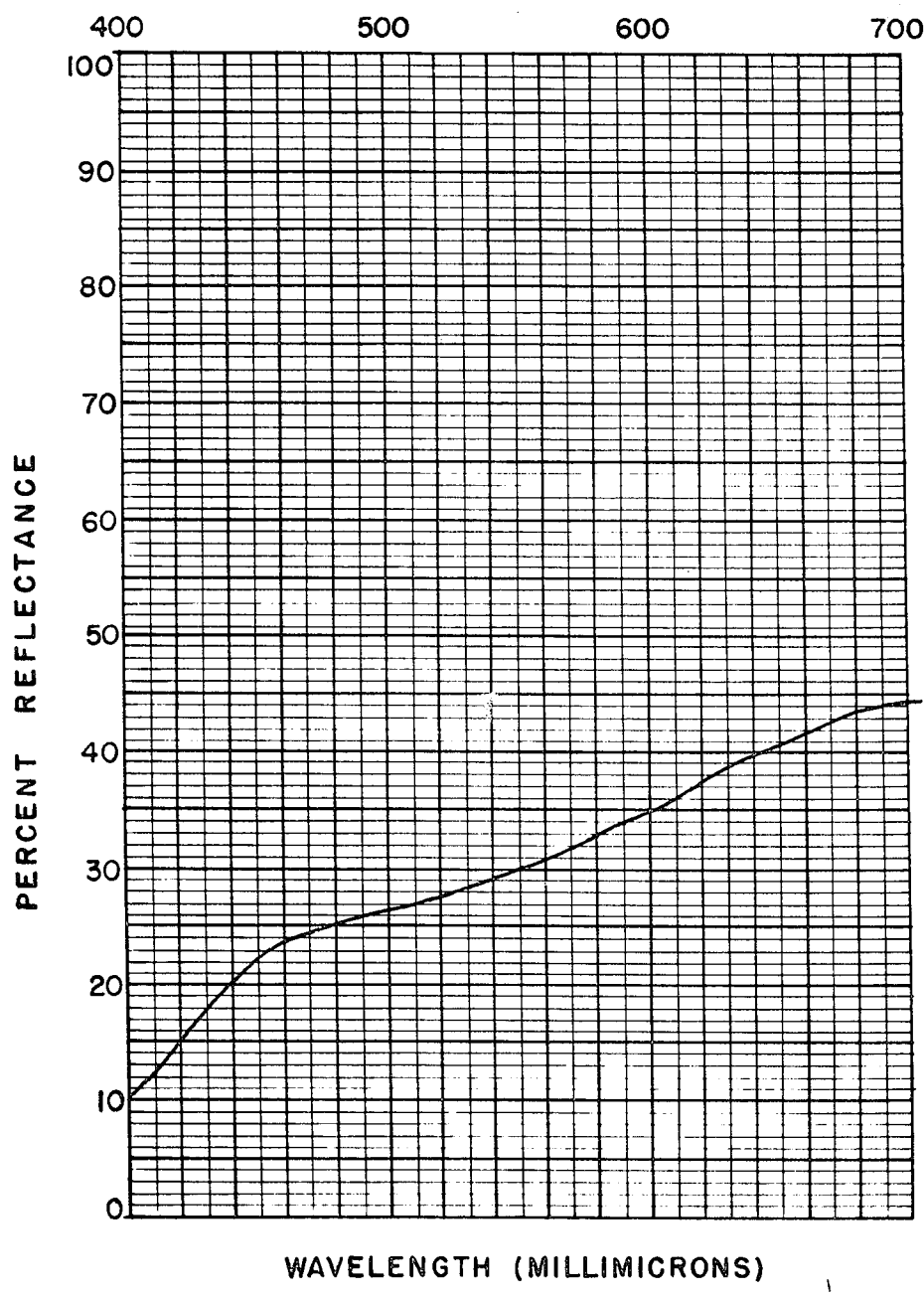
Figure 7:
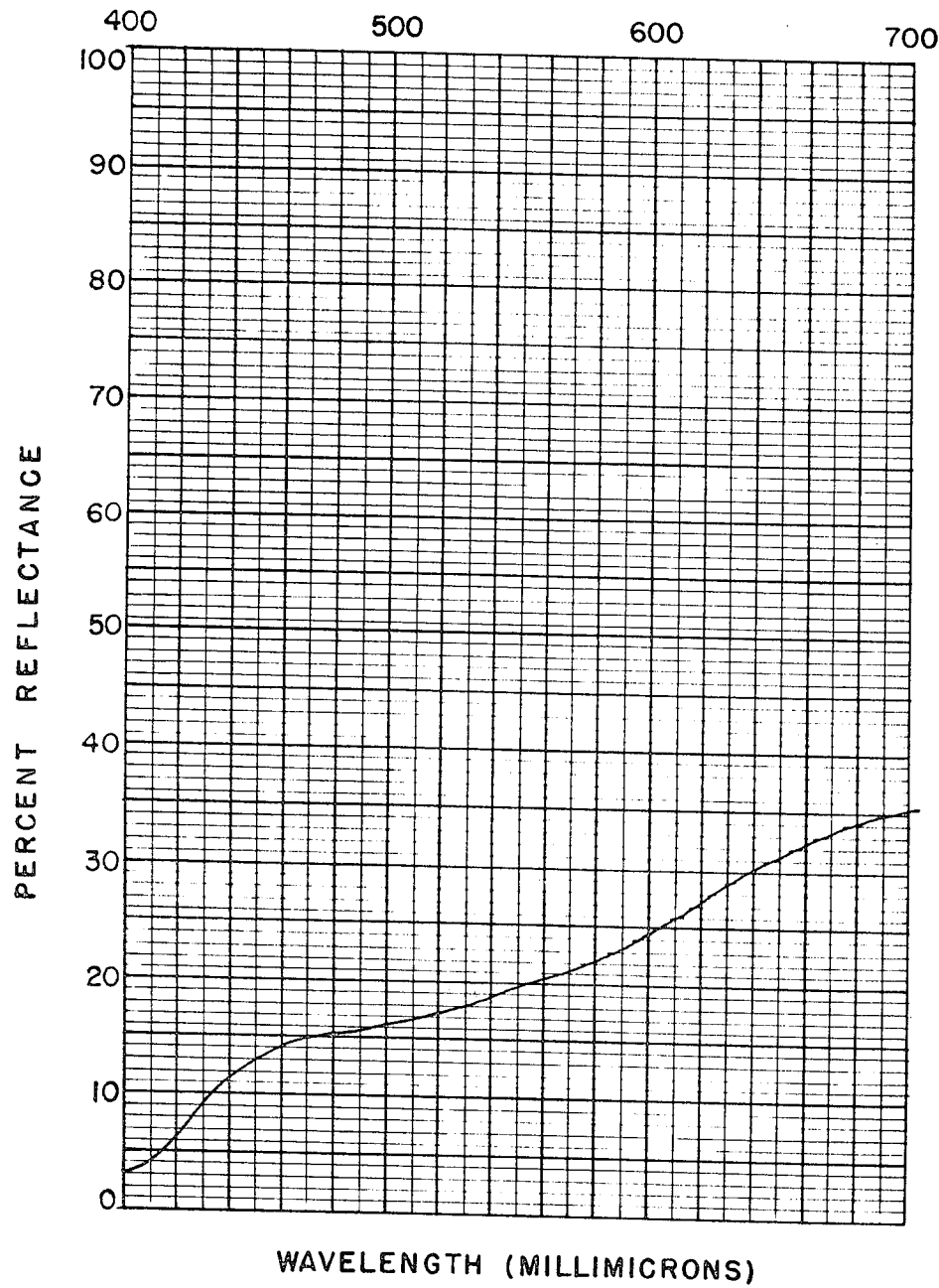
Figure 8:
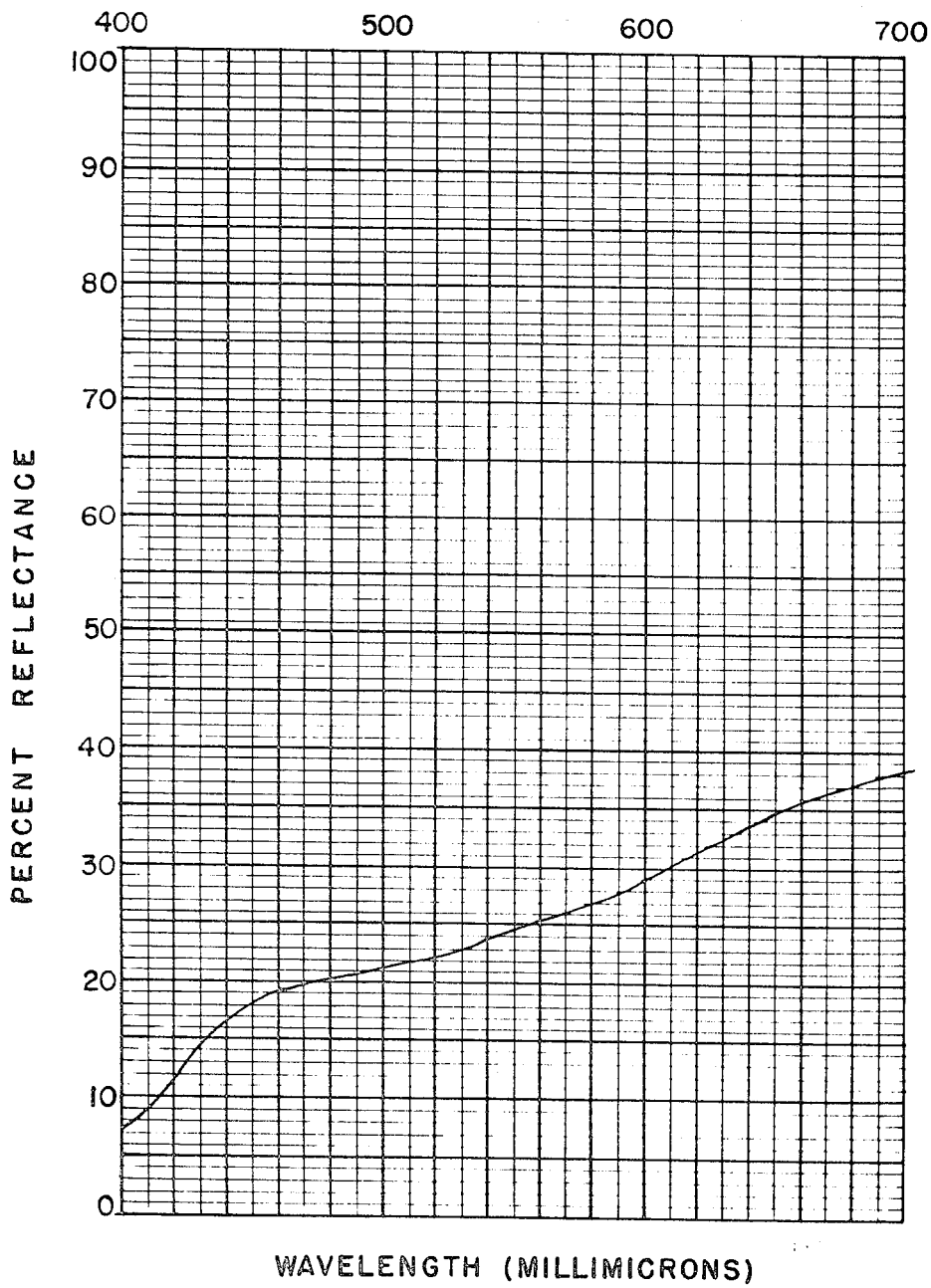
Figure 9:
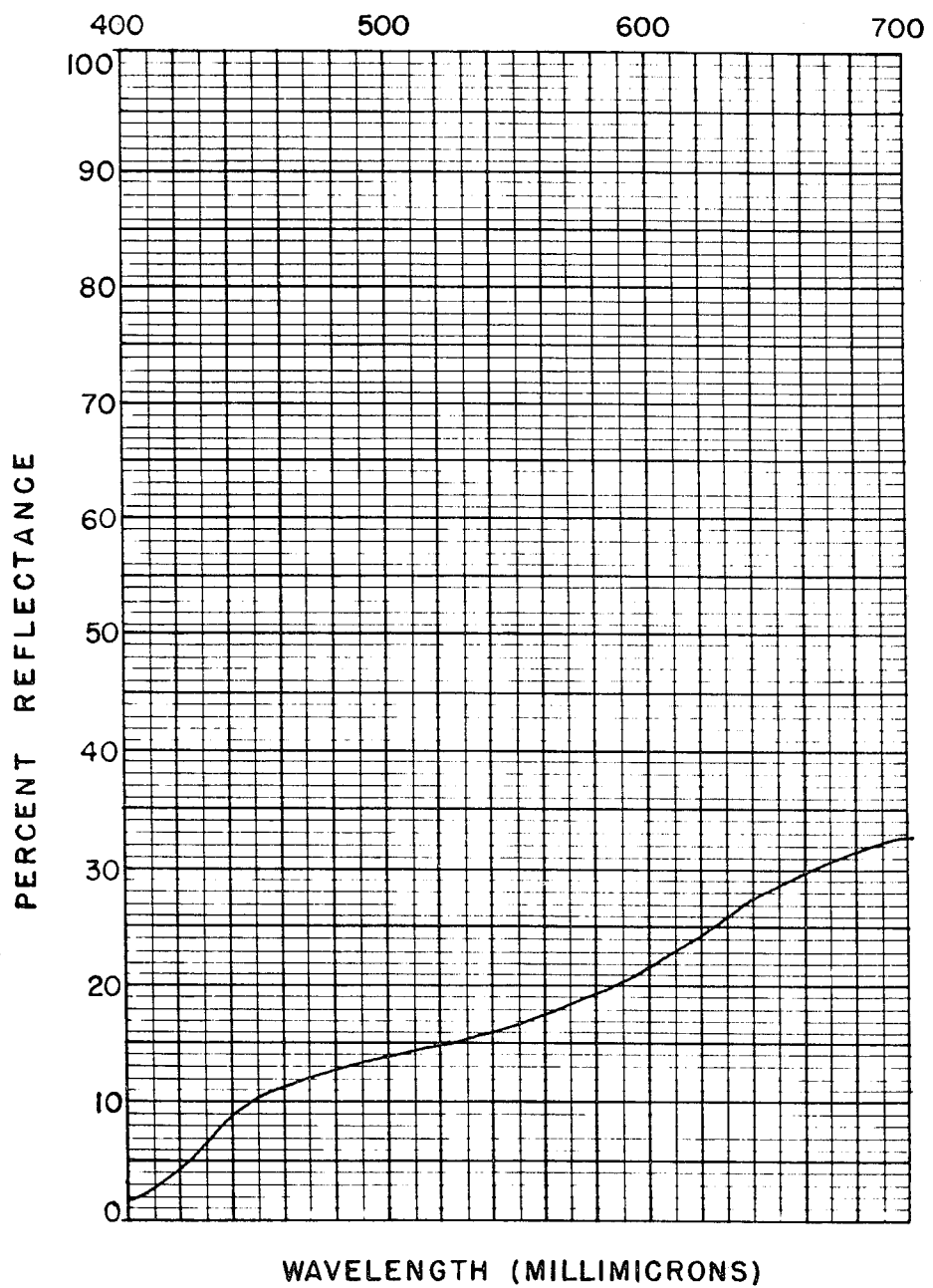
Figure 10:
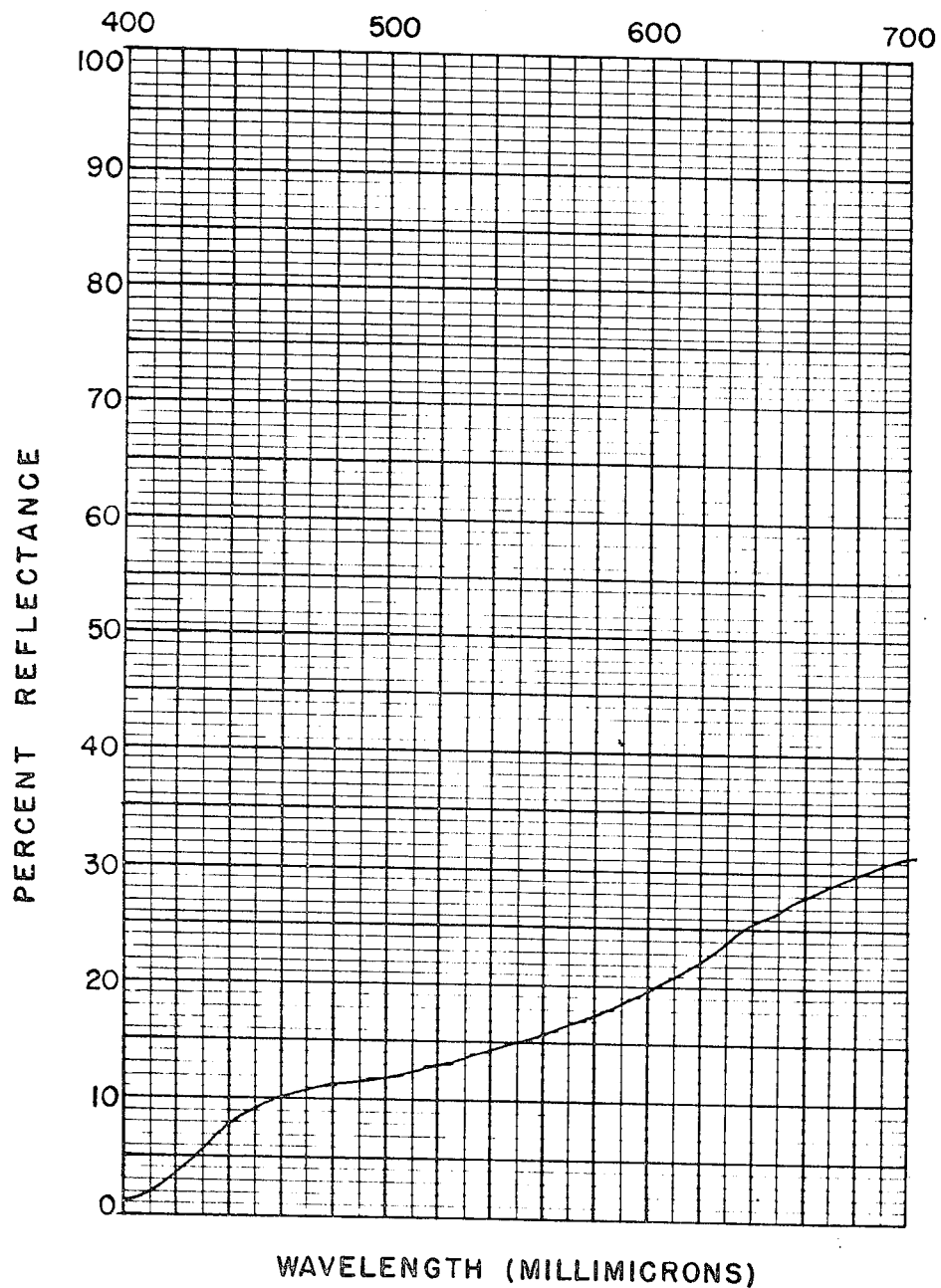
Figure 11:
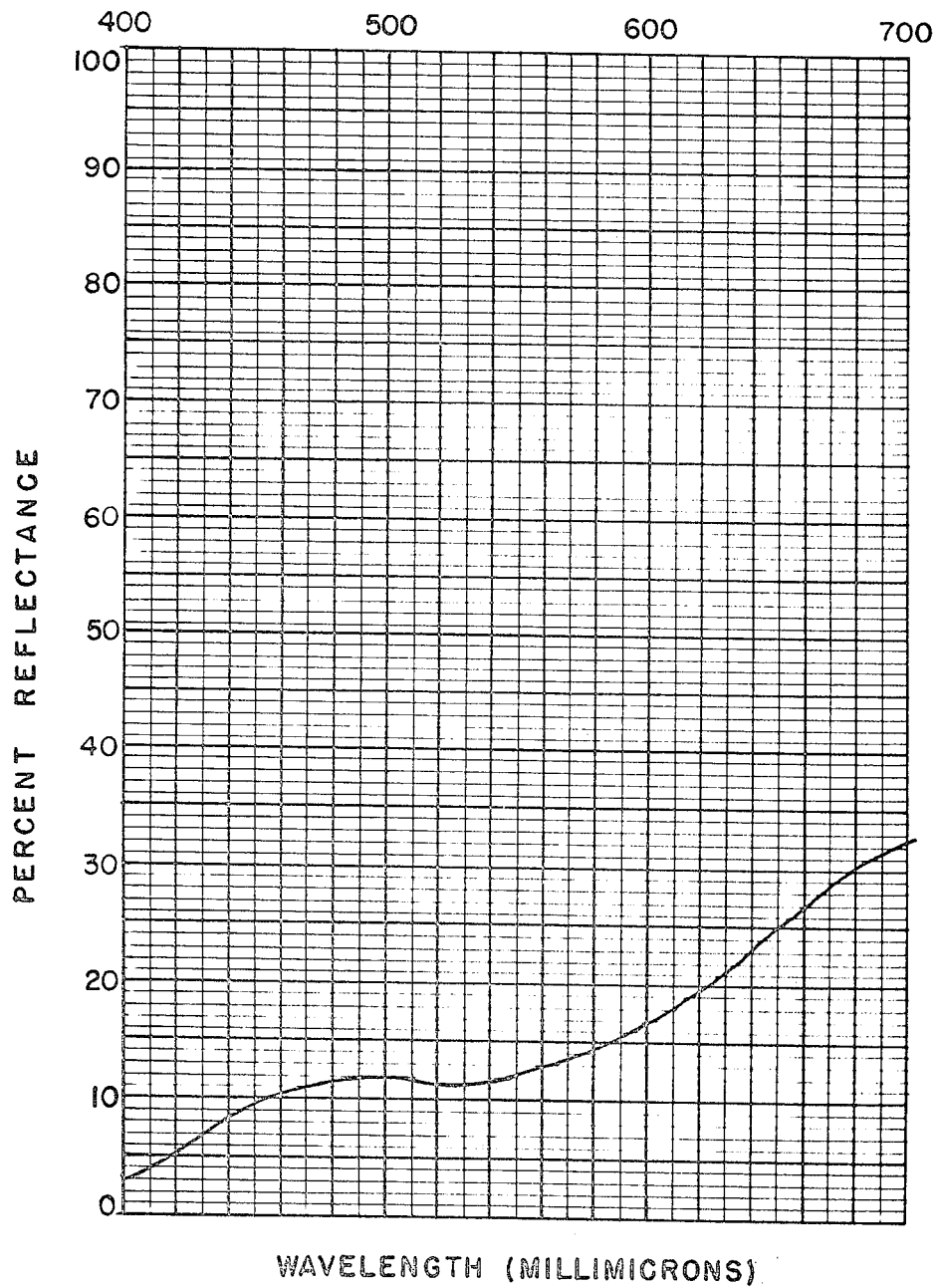
Figure 12:
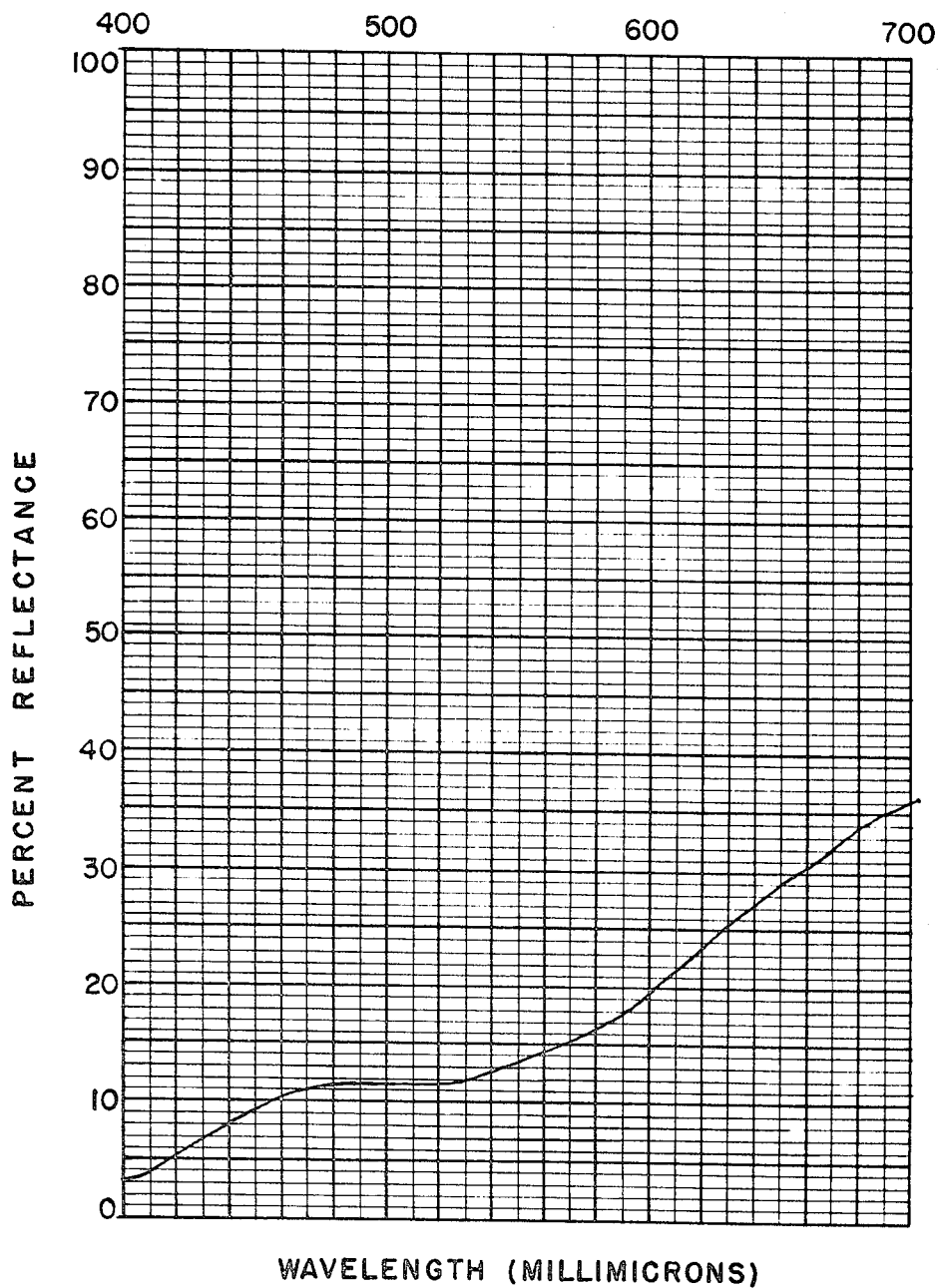

FIGS. 1 through 12 of the drawings are spectrophotometric reflectance curves obtained when 1-centimeter glass cells are filled with a diluted (1:200) whole harvest mash sample which is taken from the harvest fermentation broth of the novel mutant strains of the present invention as well as the additional 10 previously described prior art strains listed in table I. The spectrophotometric reflectance curve of a material constitutes a permanent record that does not require maintenance of a sample. Furthermore, the units in which the curve is expressed are internationally understood and accepted as a means of measuring color. In FIGS. 1 through 12, the wavelength of light in millimicrons is plotted as the abscissa against the reflectance as the ordinate. The wavelength of light has been adopted internationally as the fundamental standard of length to which all other standards of length are referred. These spectrophotometric reflectance curves were determined with a recording spectrophotometer known as the General Electric Hardy Recording Spectrophotometer with the sample backed with magnesium oxide, the reference standard being magnesium oxide, and with the specular component excluded. The curves are recorded on General Electric Co. Chart paper NP 62581.

With regard to the aforementioned spectrophotometric determination it should be noted that dilution of the whole harvest mash is necessary to produce the mathematical results as stated. If the whole harvest mash is used undiluted, the stated reflectance curve will not be evident. It is only when the whole harvest mash is diluted with water at the rate of one part of whole harvest mash to 199 parts of water that the unusual results of a reflectance curve having either a maximum or a point of inflection of zero slope between 460 m$\mu$ and 520 m$\mu$ becomes evident.

A whole harvest mash is the untreated mash obtained after a fermentation employing the following medium:

Starch—45 grams
$CaCO_3$—10.5 grams
$NH_4Cl$—1.5 grams
Cottonseed flour—45 grams
Yeast—1.5 grams
Water—q.s. to —1000 ml.
Lard oil—3% (Vol./vol. of medium)

has proceeded to the point where biosynthesis of the primary antibiotic product has stopped for all practical purposes. Generally, under the conditions set forth hereinbelow, the antibiotic potency of the fermentation mash, as may be conventionally determined, ceases to rise appreciably after the fermentation has proceeded for from about 140 to about 160 hours.

The novel mutant strains of S. aureofaciens of the present invention which produce no other tetracycline except 7-chloro-6-demethyltetracycline possess essentially the same morphological characteristics as do the strains which concomitantly produce 7-chlorotetracycline, tetracycline, 7-chloro-6-demethyltetracycline and 6-demethyltetracycline and those strains which produce 7-chloro-6-demethyltetracycline and a substantial proportion of 6-demethyltetracycline, but differ among themselves in the same general manner that these prior art strains differ from each other as has been described in a number of scientific papers which have been published. The data appearing below will serve to further distinguish the novel mutant strains of S. aureofaciens from the original A-377 —strain available as NRRL 2209 and the McCormick et al. strain, ATCC No. 12551 (S-604). In the following color observations on a variety of media, the color data strain S-604 (ATCC 12551) have been reproduced from U.S. Pat. No. 2,878,289.

To illustrate the visual color variations among the novel mutant strains S. aureofaciens of the present invention, these strains were grown on AP4 agar and the following observations were made.

COLOR OBSERVATIONS:[1] S. aureofaciens; AP4 AGAR; SIX DAY INCUBATION AT 26.5° C.

| Strain | Single colonies | | Mass growth |
|---|---|---|---|
| | Major Colony Type I | Minor Colony Type II | |
| 1E-2322 | Burgundy to dark rose brown | Ebony brown | Burgundy to dark rose brown. |
| 1E-2750 | Chocolate brown | do | Rose brown. |

[1] Colors here and elsewhere throughout this specification are according to the Color Harmony Manual, Third Edition, Container Corporation of America.

FORMULATION OF AP4 AGAR

| | |
|---|---|
| Sucrose | 1.0 grams |
| $MgSO_4.7H_2O$ | 0.025 grams |
| $KH_2PO_4$ | 0.2 grams |
| $(NH_4)_2HPO_4$ | 0.2 —grams |
| Cornsteep | 0.4 grams |
| Bacto agar | 2.0 grams |
| Water, q.s. | 100.0 ml. |
| Post Sterilization pH is 6.3 | |

The novel S. aureofaciens strains of the present invention were differentiated from S. aureofaciens A-377 (NRRL 2209) by observation of growth characteristics on various media incubated at 26.5° C. until maturity.

(1) GLYCEROL ASPARAGINE BEEF EXTRACT AGAR

| | |
|---|---|
| Glycerol | 1.0 grams |
| L-asparagine | 0.05 grams |
| Beef extract | 0.2 grams |
| $KH_2PO_4$ | 0.05 grams |
| Bacto agar | 1.5 grams |
| Distilled water, q.s. | 100 ml. |
| Adjust to pH 7.0 with 50% KOH | |
| Post sterilization pH is 7.1 | |

| Streptomyces aureofaciens | | |
|---|---|---|
| | Strain 1E-2322 | Strain S-604 |
| Growth | Moderate, chocolate to rose brown | Abundant, venetian red. |
| Aerial hyphae | Abundant, white becoming pussywillow grey | Abundant, white to rose grey. |
| Sporulation | Incomplete | Slight becoming abundant. |
| Diffusible pigment | Deep amber | Reddish-brown. |
| Reverse | Deep brown to rose brown | Brown-mahogany. |
| | Strain A-377 | Strain 1E-2750 |
| Growth | Fair | Moderate, sepia brown to deep brown mahogany. |
| Aerial hyphae | White, uniform | Thin to fair, white. |
| Sporulation | None | None. |
| Diffusible pigment | Yellow | Tawny becoming amber. |
| Reverse | Yellow to light orange yellow | Sepia brown to deep brown mahogany. |

(2) DEXTRIN CZAPEK-DOX AGAR

| | |
|---|---|
| Dextrin | 1.0 grams |
| NaNO$_3$ | 0.2 grams |
| K$_2$HPO$_4$ | 0.1 grams |
| MgSO$_4$.7H$_2$O | 0.05 grams |
| KCl | 0.05 grams |
| FeSO$_4$.7H$_2$O | 0.001 grams |
| Bacto agar | 1.5 grams |
| Distilled water, q.s. | 100.0 ml. |
| Post Sterilization pH is 7.2 | |

(4) Q4 CORNSTEEP AGAR

| | |
|---|---|
| Cornsteep | 9 grams |
| Sucrose | 10 grams |
| MgSO$_4$.7H$_2$O | 0.25 grams |
| (NH$_4$)$_2$HPO$_4$ | 2 grams |
| KH$_2$PO$_4$ | 4 grams |
| Crude agar | 30 grams |
| Water q.s. | 1000 ml. |
| Post sterilization pH is 6.5 | |

*Streptomyces aureofaciens*

| | Strain 1E-2322 | Strain S-604 |
|---|---|---|
| Growth | Confluent, thin, translucent, colorless | Sparse, hyaline. |
| Aerial hyphae | None | None. |
| Sporulation | do | Do. |
| Diffusible pigment | do | Do. |
| Reverse | Translucent | Apigmentous. |

| | Strain A-377 | Strain 1E-2750 |
|---|---|---|
| Growth | Profuse | Confluent, thin, transparent, colorless. |
| Aerial hyphae | Abundant, lead grey, water white surface globules | None. |
| Sporulation | Abundant | Do. |
| Diffusible pigment | Slight, pale yellow | Do. |
| Reverse | Apigmentous | Translucent. |

(3) AP4 AGAR (AS DESCRIBED ABOVE)

*Streptomyces aureofaciens*

| | Strain 1E-2322 | Strain S-604 |
|---|---|---|
| Growth | Profuse, burgundy to dark rose brown | Profuse. |
| Aerial hyphae | Moderate, pussywillow grey to ashes | Abundant, dark rose taupe. |
| Sporulation | Fair | Very abundant, uniform. |
| Diffusible pigment | Deep red-brown | Very concentrated, deep brown to deep brown mahogany. |
| Reverse | Burgundy to dark rose brown | Dark brown mahogany. |

| | Strain A-377 | Strain 1E-2750 |
|---|---|---|
| Growth | Profuse | Abundant to profuse, cordovan to ebony brown. |
| Aerial hyphae | Abundant, beaver | Thin to moderate, pussywillow grey. |
| Sporulation | Very abundant, uniform | Thin to moderate. |
| Diffusible pigment | Light greenish-yellow | Reddish brown to deep reddish brown. |
| Reverse | Covert brown | Cordovan to ebony brown. |

*Streptomyces aureofaciens*

| | Strain 1E-2322 | Strain S-604 |
|---|---|---|
| Growth | Abundant, burgundy to dark rose brown | Profuse, burgundy. |
| Aerial hyphae | Thin, ashes | Profuse, chocolate. |
| Sporulation | Scant | Profuse. |
| Diffusible pigment | Burgundy to dark rose brown | Burgundy. |
| Reverse | do | Do. |

| | Strain A-377 | Strain 1E-2750 |
|---|---|---|
| Growth | Excellent, pale yellow | Abundant, cordovan to ebony brown. |
| Aerial hyphae | Profuse, dark brown | Fair to moderate, pussywillow grey to ashes. |
| Sporulation | Profuse | Thin to fair. |
| Diffusible pigment | Orange-brown | Cordovan. |
| Reverse | Orange to orange-yellow | Ebony brown. |

(5) OTHER AGAR MEDIA

*Streptomyces aureofaciens*

| Medium | Strain 1E-2322 | Strain S-604 |
|---|---|---|
| Nutrient agar | Thin growth; chocolate brown. No aerial hyphae. Light purplish soluble pigment. Reverse: chocolate brown. | Poor growth. Taupe brown to dark brown. No aerial hyphae. Reverse: taupe brown. Reddish brown soluble pigment. |
| Glucose asparagine-meat extract agar | Abundant growth; deep brown. Abundant aerial hyphae; white becoming ashes. Abundant sporulation. Deep yellow soluble pigment. Reverse: deep brown. | Abundant growth. Heavy aerial hyphae mottled. Rose taupe to fawn to camel. Sporulation: abundant. Reverse: taupe brown. Reddish brown soluble pigment. |
| Purple milk | Pronounced growth collar; taupe brown to rose brown. Little significant pH change. False alkaline color reaction due to pigment diffusion. pH 6.75 at 2 weeks. | Slight deep red mahogany growth collar. Little significant pH change nor apparent peptonization. Slight false alkaline color reaction due to diffusion of soluble pigment. |
| Potato slants | Profuse, moist crenulated growth; dark luggage tan becoming 7po [1] to black plum. Rose taupe soluble pigment. No aerial hyphae. | Profuse, moist smooth nodulated growth; dark brown mahogany with peach tan trace. Aerial hyphae; none to abundant becoming white to camel. Sporulation abundant in areas of heavy aerial hyphae. Chocolate to chocolate brown soluble pigment. |

[1] Color chip code according to the Color Harmony Manual, Third Edition, Container Corp. of America. No assigned color name.

*Streptomyces aureofaciens*

| Medium | Strain A-377 | Strain 1E-2750 |
|---|---|---|
| Nutrient agar | Fair growth. No aerial hyphae. Reverse: pale yellow. Yellow to light brownish yellow soluble pigment. | Poor to fair confluent growth; dark brown mahogany. No aerial hyphae. Tawny diffusible pigment tinted reddish brown. Reverse: dark brown mahogany. |
| Glucose asparagine-meat extract agar. | Fair growth. Aerial hyphae white becoming increasingly grey with increase in spore formation. Reverse: light yellow. Light yellow soluble pigment. | Good to abundant growth; copper brown to brown mahogany. Abundant aerial hyphae uniformly pussywillow grey. Abundant sporulation. Diffusible pigment light tawny-yellow becoming amber. Reverse: copper brown to brown mahogany becoming dark brown mahogany. |
| Purple milk | Slight white to pale yellow growth collar. Little significant pH change nor apparent peptonization in 15 days. | Pronounced growth collar; taupe brown to dark rose brown. Little significant pH change. False alkaline color reaction due to pigment diffusion. pH 6.75 at 2 weeks. |
| Potato slants | Profuse, moist smooth nodulated growth; light melon yellow to antique rose. Aerial hyphae trace. No soluble pigment. | Profuse, moist, crenulated growth; light fawn to copper brown becoming black plum. Tendency to form white dense areas of aerial hyphae at separated foci. Diffusible pigment; rose taupe to taupe brown. |

(6) MICROSCOPIC OBSERVATIONS

| S. aureofaciens | | Glucose asparagine beef extract agar | Q4 agar |
|---|---|---|---|
| Strain 1E-2322 | Mycelium | Flexuous, continuous, branched. Diameter 0.8 to 1.2μ. | Flexuous, continuous, branched. Diameter 0.8 to 1.2μ. |
| | Spores | Spherical to ovoidal. Diameter 0.8 to 1.5μ. | Spherical to ovoidal. Diameter 0.8 to 1.5μ. |
| Strain S-604 | Mycelium | Flexuous, continuous, branched. Diameter 0.8 to 1.0μ. | Flexuous, continuous, branched. Diameter 0.8 to 1.2μ. |
| | Spores | Spheroidal to ovoidal. Diameter 1.5 to 2.0μ. | Spheroidal to ovoidal. Diameter 1.5 to 2.0μ. |
| Strain A-377 | Mycelium | Flexuous, continuous, branched. Diameter 0.7 to 1.0μ. | Flexuous, continuous, branched. Diameter 0.8 to 1.2μ. |
| | Spores | Spheroidal to ovoidal. Diameter 1.5 to 2.0μ. | Spheroidal to ovoidal. Diameter 1.5 to 2.0μ. |
| Strain 1E-2750 | Mycelium | Flexuous, continuous, branched. Diameter 0.8 to 1.2μ. | Flexuous, continuous, branched. Diameter 0.8 to 1.2μ. |
| | Spores | Spherical to ovoidal. Diameter 0.8 to 1.5μ. | Spherical to ovoidal. Diameter 0.8 to 1.5μ. |

NOTE.—Mycelial and spore morphology, as viewed through the light microscope, is apparently similar for strains 1E-2322 and 1E-2750 as for strains A-377 and S-604. However, the diameters for typical mycelium and for spores of the former strains appear to be characteristically smaller than for the latter. All strains demonstrate continuous, flexuous, branched mycelium with an occasional tendency of aerial hyphae to develop hooks or loops, or to coil into primitive loose spirals as is typical of the species S. aureofaciens.

The conditions of the fermentation are generally the same as for the presently known methods of producing chlorotetracycline by fermentation. That is, the fermentation medium contains the usual assimilable sources of carbon, nitrogen and inorganic salts. Suitable nutrient substances include starch, dextrose, cane sugar, glucose, molasses, soybean meal, milk solids, yeast, meat extracts, peptone, urea, cornsteep liquor, cottonseed meal, distillers—3 solubles, glyceride oils, fish meal and other conventional substances. The inorganic salts include such things as calcium carbonate, ammonium sulfate, ammonium chloride, and salts of the various trace elements such as manganese, cobalt, zinc, copper, iron and the like.

The other general conditions of the fermentation such as hydrogen ion concentration, temperature, time, rate of aeration, preparation of the inoculum, sterilization, inoculation and the like are conventional and may be similar to those for the production of 7-chloro-6-demethyltetracycline shown in U.S. Pat. No. 2,878,289 (McCormick et al.).

The recovery of the 7-chloro-6-demethyltetracycline from the fermentation liquor is conventional and need not be described, as numerous methods for the recovery of this product from fermentation liquors have already been published.

The invention will be described in greater detail in conjunction with the following specific examples.

EXAMPLE 1

A fermentation medium was prepared which contained the following ingredients:

Stach—45 grams
CaCO₃—10.5 grams
NH₄Cl—1.5 grams
Cottonseed flour—45 grams
Yeast—1.5 grams
Water—q.s. to—1000 milliliters This medium was dispensed in appropriate amounts into flasks containing 3 percent (vol./vol. of medium) of lard oil and then sterilized. These flasks were then divided into 12 approximately equal groups. Each group was then inoculated with a vegetative inoculum of one of the following strains of S. aureofaciens.

S-604 (ATCC 12551—)
S-1071 (ATCC 12552)
V-62 (ATCC 12553)
B-740 (ATCC 12554)
V-138
E-475
E-1311
ED-1723
ED-2047
Ed-2314
1E-2322 (NRRL 3204)
1E-2750 (NRRL 3234)

All of the flasks were then incubated on a rotary shaker with a 2½-inch circular motion at 185–200 r.p.m. at 25°– C. for 180 hours. Samples were withdrawn, diluted with 199 parts of water, and the reflectance curves determined as set forth hereinabove. The results are set forth in FIGS. 1 through 12. The harvest mash assays are recorded in table I below. These assays were performed using the following methods:

TABLE I

| S. aureofaciens Strain No. | Assay | | | |
|---|---|---|---|---|
| | No. 1 | No. 2 | No. 3 | |
| | DMCTC, γ/ml. | Total tetra-cyclines, γ/ml. | DMTC γ/ml. quantitative paper chromatogram | Percent DMTC |
| S-604 | 1,193 | 2,037 | 110 | 8.4 |
| S-1071 | 876 | 2,428 | 138 | 13.1 |
| V-62 | 1,177 | 2,255 | 573 | 32.7 |
| B-740 | 1,042 | 2,553 | 380 | 26.7 |
| V-138 | 960 | 1,817 | 645 | 35.5 |
| E-475 | 2,348 | 3,601 | 847 | 23.5 |
| E-1311 | 3,186 | 4,263 | 820 | 19.2 |
| ED-1723 | 1,961 | 3,304 | 1,320 | 39.9 |
| ED-2047 | 4,726 | 6,316 | 1,775 | 28.1 |
| ED-2314 | 4,946 | 6,650 | 1,100 | 16.5 |
| 1E-2322 | 3,281 | 3,197 | None detected [1] | 0 |
| 1E-2750 | 3,451 | 3,566 | do | 0 |

[1] No 6-demethyltetracycline was found at the lowest detectable level of 1γ/ml.

Assay No. 1

This assay is based upon the difference in the rates of conversion of 7-chloro-6-demethyltetracycline and 6-demethyltetracycline to their respective anhydro forms by an acid catalyzed, first order reaction. The degree of conversion to the anhydro form depends upon time, temperature and acid strength involving a reaction which results in a decrease in absorbance at 368 mμ and an increase in absorbance at 440 mμ.

Assay No. 2

This assay is based upon the same basic principle as Assay No. 1 except that in this case the sample is treated with acid to degrade all tetracycline present to the anhydro form in one instance and compared to a sample treated with water in the second instance.

Assay No. 3

The assay figures in this column were determined by a conventional paper chromatographic procedure using the system 0.3 M sodium phosphate n-butyl acetate, giving an $R_f$ of 0.30 for 6-demethyltetracycline. Three similar systems, published in the Journal of the American Chemical Society, Vol. —79, pp. 4561–4563 (1957), McCormick et al.) are listed below.

| System | 6-Demethyltetracycline $R_f$ |
| --- | --- |
| 0.3 M Sodium Phosphate/n-butanol (pH 3.0) | 0.30 |
| Mac Ilvaine's Buffer/ethyl acetate (pH 4.7) | 0.27 |
| 0.3N $H_3PO_4$, 0.1% $CCl_3COOH$ 9:1 | |
| $CHCl_3$-n-Butanol | 0.22 |

In this table I, the percent 6-demethyltetracycline (Column 4) of the first four strains (S-604, S-1071, V-62 and B-740) was determined by finding the amount of 6-demethyltetracycline by paper chromatography (Column 3) and dividing this figure by the total amount of demethyltetracyclines determined by spectrophotometric analysis (Column 1) plus the chromatographic analysis (Column 3). The percent 6-demethyltetracycline (Column 4) produced by the balance of the strains is determined by dividing the chromatographic analysis (Column 3) by the spectrophotometric analysis of the total tetracyclines (Column 2).

What is claimed is:

1. The process of producing 7-chloro-6-demethyltetracycline which comprises cultivating a strain of *Streptomyces aureofaciens* which produces 7-chloro-6-demethyltetracycline exclusively selected from the group consisting of *S. aureofaciens* NRRL 3204 and mutants thereof under submerged aerobic conditions in an aqueous nutrient medium containing assimilable sources of carbon, nitrogen and inorganic salts until substantial quantities of 7-chloro-6-demethyltetracycline as produced, said 7-chloro-6-demethyltetracycline-producing strain of *Streptomyces aureofaciens* being characterized by its ability to impart to a 200-fold aqueous dilution of the whole harvest mash a color characterized by a spectrophotometric reflectance curve, when plotted linearly, having a maximum between 460 m$\mu$ and 520 m$\mu$.

2. The process of producing 7-chloro-6-demethyltetracycline which comprises cultivating a strain of Streptomyces aureofaciens which produces 7-chloro-6-demethyltetracycline exclusively selected from the group consisting of *S. aureofaciens* NRRL 3234 and mutants thereof under submerged aerobic conditions in an aqueous nutrient medium containing assimilable sources of carbon, nitrogen and inorganic salts until substantial quantities 7-chloro-6-demethyltetracycline are produced, said 7-chloro-6-demethyltetracycline-producing strain of *Streptomyces aureofaciens* being characterized by its ability to impart to a 200-fold aqueous dilution of the whole harvest mash a color characterized by a spectrophotometric reflectance curve, when plotted linearly, having a point of inflection of zero slope between 460 m$\mu$ and 520 m$\mu$.